United States Patent
Yamane

(10) Patent No.: US 11,378,021 B2
(45) Date of Patent: Jul. 5, 2022

(54) VARIABLE COMPRESSION RATIO INTERNAL COMBUSTION ENGINE

(71) Applicant: TOYOTA JIDOSHA KABUSHIKI KAISHA, Toyota (JP)

(72) Inventor: Naruto Yamane, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 164 days.

(21) Appl. No.: 15/823,927

(22) Filed: Nov. 28, 2017

(65) Prior Publication Data

US 2018/0149095 A1    May 31, 2018

(30) Foreign Application Priority Data

Nov. 29, 2016    (JP) .............................. JP2016-231154

(51) Int. Cl.
| | |
|---|---|
| *F02D 15/02* | (2006.01) |
| *F02D 23/00* | (2006.01) |
| *F02B 75/04* | (2006.01) |
| *F02D 41/00* | (2006.01) |
| *F02B 39/10* | (2006.01) |
| *F02B 25/14* | (2006.01) |
| *F02D 13/02* | (2006.01) |

(52) U.S. Cl.
CPC ............ *F02D 15/02* (2013.01); *F02B 75/045* (2013.01); *F02D 23/00* (2013.01); *F02D 41/005* (2013.01); *F02D 41/0007* (2013.01); *F02D 41/0077* (2013.01); *F02B 25/145* (2013.01); *F02B 39/10* (2013.01); *F02D 13/0215* (2013.01); *F02D 2200/10* (2013.01); *Y02T 10/12* (2013.01)

(58) Field of Classification Search
CPC ......... F02D 15/02; F02D 23/00; F02B 75/045
USPC ....................................................... 123/48 B
See application file for complete search history.

(56) References Cited

U.S. PATENT DOCUMENTS

2009/0178632 A1*   7/2009  Akihisa ................. F02B 75/041
                                                                    123/90.15
2010/0287932 A1*  11/2010  Tanaka .................... F02B 39/10
                                                                    60/602

(Continued)

FOREIGN PATENT DOCUMENTS

| CN | 103857893 A | 6/2014 |
|---|---|---|
| CN | 104603427 A | 5/2015 |

(Continued)

*Primary Examiner* — Lindsay M Low
*Assistant Examiner* — Omar Morales
(74) *Attorney, Agent, or Firm* — Finnegan, Henderson, Farabow, Garrett & Dunner, LLP

(57) ABSTRACT

The variable compression ratio internal combustion engine 1 comprises: a variable compression ratio mechanism 6 able to change a mechanical compression ratio; an exhaust promotion mechanism 50, 55 able to reduce cylinder residual gas after an exhaust stroke of cylinders; and a control device 80 configured to control the mechanical compression ratio by the variable compression ratio mechanism and control an operation of the exhaust promotion mechanism. The control device is configured to operate the exhaust promotion mechanism in at least a partial time period of a time period from when it is demanded that the mechanical compression ratio be raised to when the mechanical compression ratio finishes being changed.

2 Claims, 7 Drawing Sheets

(56) References Cited

U.S. PATENT DOCUMENTS

| | | | |
|---|---|---|---|
| 2011/0180047 A1* | 7/2011 | Yamakawa | F02B 1/12 123/564 |
| 2013/0312407 A1* | 11/2013 | Surnilla | F02D 41/0002 60/605.1 |
| 2013/0343886 A1* | 12/2013 | Karim | F04D 29/284 415/208.1 |
| 2014/0261336 A1 | 9/2014 | Takahashi et al. | |
| 2015/0219024 A1 | 8/2015 | Kurashima | |
| 2015/0233288 A1* | 8/2015 | Paul | F02D 15/02 123/48 B |
| 2016/0010492 A1* | 1/2016 | Cavagnaro | F01D 5/02 417/423.1 |

FOREIGN PATENT DOCUMENTS

| | | |
|---|---|---|
| JP | 2008-274963 A | 11/2008 |
| JP | JP 2016-142137 | 8/2016 |

* cited by examiner

VARIABLE COMPRESSION RATIO INTERNAL COMBUSTION ENGINE

TECHNICAL FIELD

The present invention relates to a variable compression ratio internal combustion engine which can change a mechanical compression ratio.

BACKGROUND ART

Known in the past has been an internal combustion engine comprising a variable compression ratio mechanism which can change a mechanical compression ratio of the internal combustion engine. As such a variable compression ratio mechanism, various mechanisms have been proposed. As one among these, one which can change the effective length of a connecting rod used in the internal combustion engine may be mentioned (for example, PTL 1). In this regard, the "effective length of a connecting rod" means the distance between a center of a crank receiving opening which receives a crank pin and a center of a piston pin receiving opening which receives a piston pin. Therefore, if the effective length of a connecting rod becomes longer, a combustion chamber volume when the piston is at top dead center of the compression stroke becomes smaller, and therefore the mechanical compression ratio increases. On the other hand, if the effective length of a connecting rod becomes shorter, the combustion chamber volume when the piston is at top dead center of the compression stroke becomes larger, and therefore the mechanical compression ratio falls.

As a variable length connecting rod which can be changed in effective length, known is one which is provided with a connecting rod body with a small end on which an eccentric member (eccentric arm or eccentric sleeve), which can turn with respect to the connecting rod body, is provided (for example, PTL 1). The eccentric member has a piston pin receiving opening which receives the piston pin. This piston pin receiving opening is provided so as to offset with respect to a turning axis of the eccentric member. In such a variable length connecting rod, if changing the turning position of the eccentric member, the effective length of the connecting rod can be changed accordingly.

Specifically, the eccentric member pivots in one direction due to the upward inertial force acting on the piston pin due to the reciprocating motion of the piston to thereby lengthen the effective length of the connecting rod. As a result, the piston rises with respect to the connecting rod body and the mechanical compression ratio is switched from a low compression ratio to a high compression ratio. On the other hand, the eccentric member pivots in the other direction due to the downward inertial force acting on the piston pin due to the reciprocating motion of the piston and the downward explosive force acting on the piston pin due to combustion of the air-fuel mixture to thereby shorten the effective length of the connecting rod. As a result, the piston descends with respect to the connecting rod body and the mechanical compression ratio is switched from a high compression ratio to a low compression ratio. Therefore, in a variable compression ratio internal combustion engine provided with a variable length connecting rod, the mechanical compression ratio is switched by inertial force from a low compression ratio to a high compression ratio and is switched by inertial force and explosive force from a high compression ratio to a low compression ratio.

CITATION LIST

Patent Literature

PLT 1: Japanese Patent Publication No. 2016-142137A

SUMMARY OF INVENTION

Technical Problem

In this regard, the inertial force is far smaller than the explosive force. For this reason, it is difficult to obtain a sufficient response when switching the mechanical compression ratio from a low compression ratio to a high compression ratio. Further, the inertial force is proportional to the square of the engine speed of the internal combustion engine, so in the low speed region of the internal combustion engine, a sufficient inertial force cannot be obtained and the response further deteriorates.

Therefore, in view of the above problem, an object of the present invention is to improve the response when raising the mechanical compression ratio in a variable compression ratio internal combustion engine provided with a variable compression ratio mechanism.

Solution to Problem

The summary of the present disclosure is as follows.

(1) A variable compression ratio internal combustion engine comprising: a variable compression ratio mechanism able to change a mechanical compression ratio; an exhaust promotion mechanism able to reduce cylinder residual gas after an exhaust stroke of cylinders; and a control device configured to control the mechanical compression ratio by the variable compression ratio mechanism and control an operation of the exhaust promotion mechanism, wherein the control device is configured to operate the exhaust promotion mechanism in at least a partial time period of a time period from when it is demanded that the mechanical compression ratio be raised to when the mechanical compression ratio finishes being changed.

(2) The variable compression ratio internal combustion engine described in above (1), wherein the variable compression ratio mechanism is a variable length connecting rod comprising a connecting rod body provided with a crank receiving opening receiving a crank pin and an effective length changing member provided with a piston pin receiving opening receiving a piston pin and attached to the connecting rod body to be able to move so as to change a length between a center of the piston pin receiving opening and a center of the crank receiving opening.

(3) The variable compression ratio internal combustion engine described in above (2), wherein the control device is configured not to operate the exhaust promotion mechanism when an engine speed is a predetermined reference speed or more.

(4) The variable compression ratio internal combustion engine described in any one of above (1) to (3), wherein the control device is configured not to operate the exhaust promotion mechanism when an engine load is a predetermined threshold value or less.

(5) The variable compression ratio internal combustion engine described in any one of above (1) to (4), further comprising a detector detecting the mechanical compression ratio finishing being changed, wherein the control device is configured to operate the exhaust promotion mechanism from when it is demanded that the mechanical compression ratio be raised to when the detector detects the mechanical compression ratio finishing being changed.

Advantageous Effects of Invention

According to the present invention, it is possible to improve the response when raising the mechanical compression ratio in a variable compression ratio internal combustion engine provided with a variable compression ratio mechanism.

DESCRIPTION OF EMBODIMENTS

Figure 1:
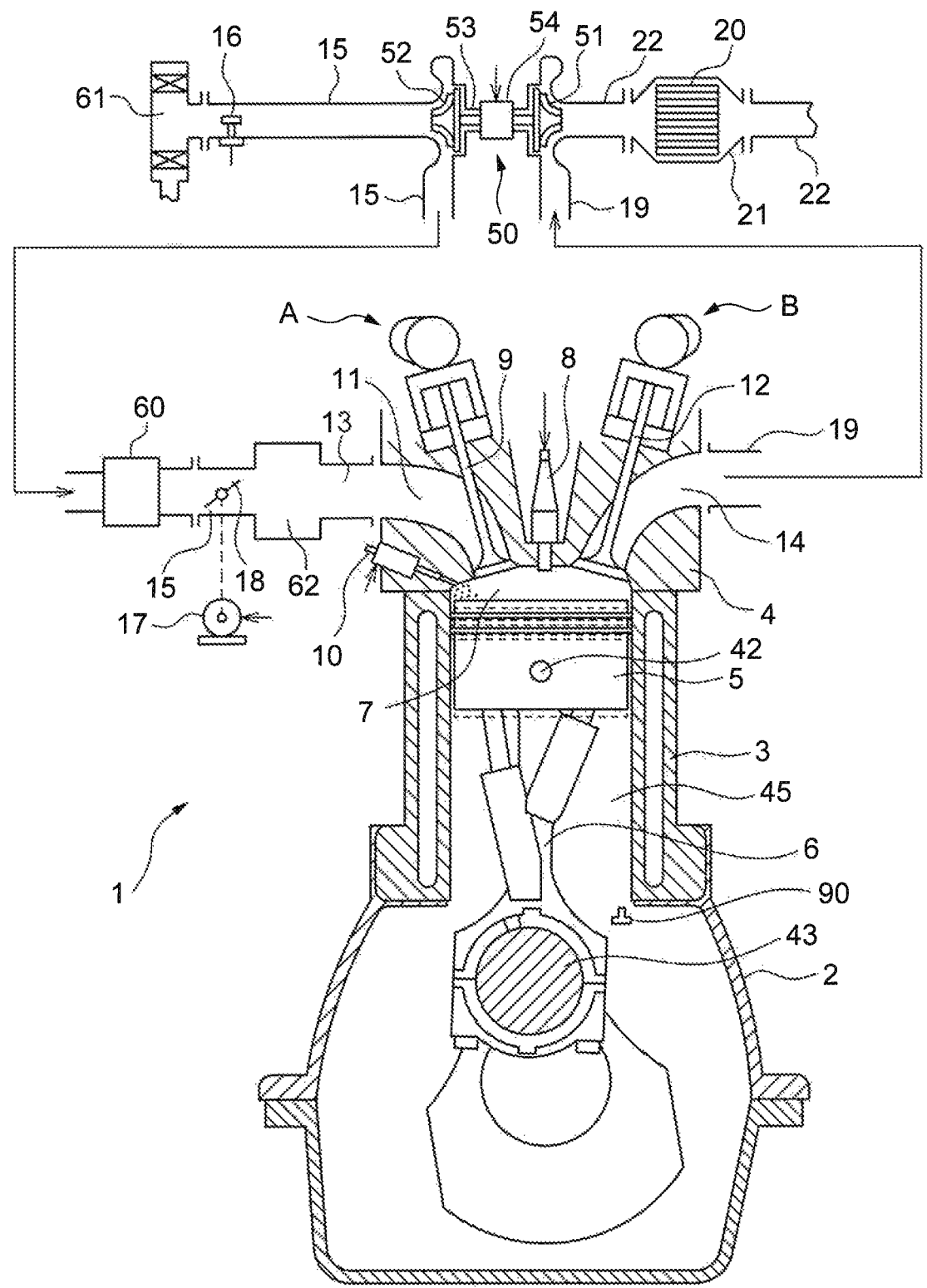
FIG. 1 is a view schematically showing a variable compression ratio internal combustion engine according to a first embodiment of the present invention.
Figure 2:
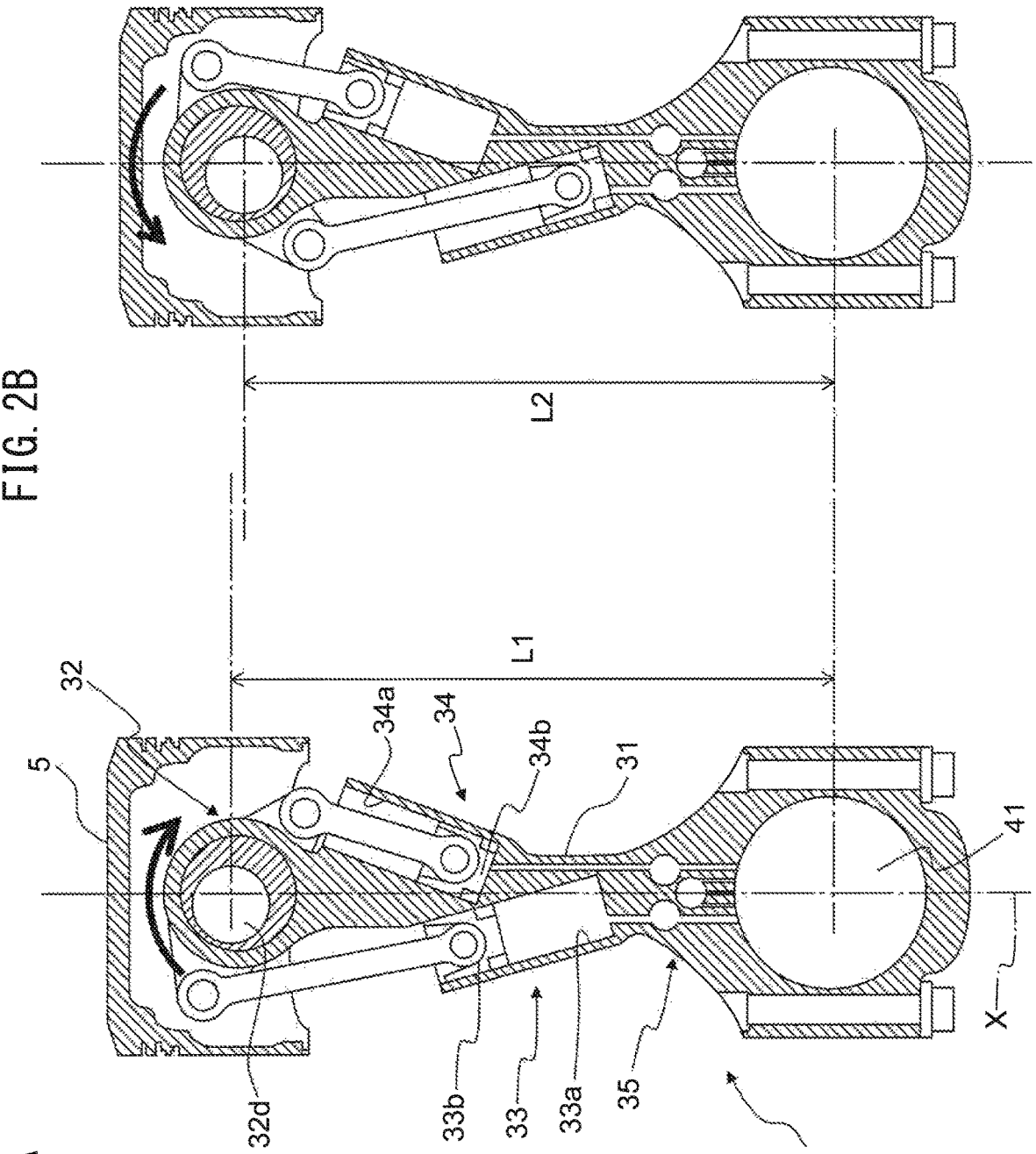
FIG. 2A is a schematic cross-sectional view of a variable length connecting rod.
FIG. 2B is a schematic cross-sectional view of a variable length connecting rod.

Below, referring to the drawings, embodiments of the present invention will be explained in detail. Note that in the following explanation, similar components will be assigned the same reference numerals.

First Embodiment

Below, referring to FIG. 1 to FIG. 4, a first embodiment of the present invention will be explained.

<Configuration of Variable Compression Ratio Internal Combustion Engine>

FIG. 1 is a view schematically showing a variable compression ratio internal combustion engine 1 according to the first embodiment of the present invention. The variable compression ratio internal combustion engine 1 in the present embodiment (below, simply referred to as the "internal combustion engine 1") is a spark ignition type internal combustion engine and is mounted in a vehicle. The internal combustion engine 1 is provided with a crankcase 2, cylinder block 3, and cylinder head 4. Inside of the cylinder block 3, pistons 5 reciprocating in the cylinder block 3 are arranged. The internal combustion engine 1 has a plurality of cylinders 45.

Combustion chambers 7 are formed in the cylinders 45 between the pistons 5 and the cylinder head 4. The cylinder head 4 is formed with intake ports 11 and exhaust ports 14. The intake ports 11 and exhaust ports 14 are connected to the combustion chambers 7. Intake valves 9 are arranged at the ends of the intake ports 11 and are formed to be able to open and close the intake ports 11. Exhaust valves 12 are arranged at the ends of the exhaust ports 14 and are formed to be able to open and close the exhaust ports 14. Further, the internal combustion engine 1 is provided with a variable valve timing mechanism A able to control the opening timings and closing timings of the intake valves 9, and a variable valve timing mechanism B able to control the opening timings and closing timings of the exhaust valves 12.

The internal combustion engine 1 is provided with fuel injectors 10 for supplying the combustion chambers 7 with fuel, and spark plugs 8 for igniting the air-fuel mixtures in the combustion chambers 7. The spark plugs 8 are fastened to the cylinder head 4. The fuel injectors 10 are arranged near the inside walls of the cylinder head 4 so as to directly inject fuel into the combustion chambers 7. That is, the fuel injectors 10 are cylinder fuel injectors. Note that, the fuel injectors 10 may be port fuel injectors injecting fuel into the intake ports 11. Further, the internal combustion engine 1 uses gasoline with a stoichiometric air-fuel ratio of 14.6 as fuel. However, the internal combustion engine 1 may use other fuel.

The internal combustion engine 1 is provided with a supercharger comprised of a turbocharger 50. The turbocharger 50 includes a turbine 51 arranged in the exhaust passage, a compressor 52 arranged in the intake passage, a shaft 53 connecting the turbine 51 and the compressor 52, and a motor 54 provided at the shaft 53.

If the flow of exhaust causes the turbine 51 to rotate, the compressor 52 also rotates and raises the pressure of the intake air. Therefore, the turbocharger 50 can use the exhaust energy to compress the intake air and make the amount of intake air increase. Further, the motor 54 can be driven to forcibly make the turbine 51 and compressor 52 rotate through the shaft 53. For this reason, at the turbocharger 50, even when the exhaust energy is low, the amount of intake air can be quickly increased, so it is possible to reduce the turbo lag (time lag from when driver steps on accelerator pedal to when output torque increases due to the turbocharger 50). The turbocharger 50 is a so-called "motor assisted turbocharger".

Further, if the motor 54 is driven, the rotation speed of the turbine 51 increases, so exhaust from the cylinders 45 is promoted and the cylinder residual gas after the exhaust stroke of the cylinders 45 is reduced. Therefore, the turbocharger 50 can function as an exhaust promotion mechanism able to reduce the cylinder residual gas after the exhaust stroke of the cylinders 45.

In the internal combustion engine 1, by driving the motor 54 of the turbocharger 50, the exhaust promotion mechanism is operated. The motor 54, for example, is driven by electric power generated by an alternator (not shown). Further, the motor 54 may be a motor-generator able to generate electric power by exhaust energy. In this case, the motor 54 may be driven by electric power generated by exhaust energy.

The intake ports 11 of the cylinders 45 are respectively connected to a surge tank 62 through corresponding intake runners 13. The surge tank 62 is connected through an intake pipe 15 to an outlet part of the compressor 52 of the turbocharger 50. Inside the intake pipe 15 between the surge tank 62 and the compressor 52, a throttle valve 18 driven by a throttle valve drive actuator 17 such as a DC motor is arranged. The throttle valve 18 can be made to turn by a throttle valve drive actuator 17 to thereby change the opening area of the intake passage. Further, the intake pipe 15 between the compressor 52 and the throttle valve 18 is provided with an intercooler 60 cooling the intake air compressed by the turbocharger 50.

The inlet part of the compressor 52 is connected through the intake pipe 15 to an air cleaner 61. Inside of the intake pipe 15 between the air cleaner 61 and the compressor 52, an air flow meter 16 is arranged for detecting the amount of intake air. The intake ports 11, intake runners 13, intake pipe 15, etc. form an intake passage for guiding air to the combustion chambers 7.

On the other hand, the exhaust ports 14 of the cylinders are connected to an exhaust manifold 19. The exhaust manifold 19 includes a plurality of runners connected to the exhaust ports 14 and a header at which these runners merge. The header of the exhaust manifold 19 is connected to the inlet part of the turbine 51 of the turbocharger 50. The outlet part of the turbine 51 is connected through an exhaust pipe 22 to a casing 21. The casing 21 contains an exhaust purification catalyst 20. The exhaust ports 14, exhaust manifold 19, exhaust pipe 22, etc. form an exhaust passage discharging exhaust gas generated by combustion of the air-fuel mixture from the combustion chambers 7

<Variable Compression Ratio Mechanism>

The internal combustion engine 1 is further provided with a variable compression ratio mechanism able to change the mechanical compression ratio. In the present embodiment, the variable length connecting rods 6 correspond to the variable compression ratio mechanism. The variable length connecting rods 6 are provided at the cylinders 45. The variable length connecting rods 6 are connected to the pistons 5 through piston pins 42 at the small diameter ends and are connected to crankpins 43 of a crankshaft at the large diameter ends.

A variable length connecting rod 6 is known art such as described in Japanese Patent Publication No. 2016-118181A etc. For this reason, the configuration and operation of the variable length connecting rod 6 will be explained just briefly below.

FIGS. 2A and 2B are schematic cross-sectional views of a variable length connecting rod 6. In the variable length connecting rod 6, the length between the center of a crank receiving opening 41 receiving a crank pin 43 and the center of a piston pin receiving opening 32d receiving a piston pin 42, that is, the effective length of the variable length connecting rod 6, is changed so as to change the mechanical compression ratio. The variable length connecting rod 6 is provided with a connecting rod body 31, an eccentric member 32 attached to the connecting rod body 31 to be able to turn, a first piston mechanism 33 and second piston mechanism 34 provided at the connecting rod body 31, and a flow direction switching mechanism 35 switching the flow of hydraulic oil to the piston mechanisms 33, 34. In the present embodiment, the eccentric member 32 corresponds to the effective length changing member attached to the connecting rod body to be able to move so as to change the effective length of the variable length connecting rod.

The flow direction switching mechanism 35 is operated by an oil feed device at the outside of the connecting rod body 31 and can be switched between a first state and a second state. The flow direction switching mechanism 35 prohibits the flow of hydraulic oil from a first cylinder 33a of the first piston mechanism 33 to a second cylinder 34a of the second piston mechanism 34, and permits the flow of hydraulic oil from the second cylinder 34a to the first cylinder 33a in the first state. The flow direction switching mechanism 35 permits the flow of hydraulic oil from the first cylinder 33a to the second cylinder 34a and prohibits the flow of hydraulic oil from the second cylinder 34a to the first cylinder 33a in the second state.

If the flow direction switching mechanism 35 is switched from the second state to the first state, the inertial force acting on the piston pin 42 due to the reciprocating motion of the piston 5 in the cylinder 45 of the internal combustion engine 1 causes the eccentric member 32 to turn in one direction (direction of arrow in FIG. 2A). For this reason, the second piston 34b of the second piston mechanism 34 is pushed inside the second cylinder 34a and the hydraulic oil inside the second cylinder 34a moves to the first cylinder 33a. As a result, as shown in FIG. 2A, the effective length of the variable length connecting rod 6 becomes longer (becomes L1). As shown in FIG. 1 by the solid line, the volume of the combustion chamber 7 when the piston 5 is at top dead center becomes smaller. On the other hand, even if the effective length of the variable length connecting rod 6 changes, the stroke length by which the piston 5 reciprocates in the cylinder 45 does not change. Therefore, at this time, the mechanical compression ratio in the internal combustion engine 1 becomes higher.

On the other hand, if the flow direction switching mechanism 35 is switched from the first state to the second state, the inertial force acting on the piston pin 42 due to the reciprocating motion of the piston 5 inside the cylinder 45 of the internal combustion engine 1 and the explosive force acting on the piston 5 due to the combustion of the air-fuel mixture inside the combustion chamber 7 cause the eccentric member 32 to turn in the other direction (direction of arrow in FIG. 2B). For this reason, the first piston 33b of the first piston mechanism 33 is pushed into the first cylinder 33a and the hydraulic oil inside the first cylinder 33a moves to the second cylinder 34a. As a result, as shown in FIG. 2B, the effective length of the variable length connecting rod 6 becomes shorter (becomes L2). As shown in FIG. 1 by the broken line, the volume of the combustion chamber 7 when the piston 5 is at top dead center becomes larger. On the other hand, as explained above, the stroke length of the piston 5 is constant. Therefore, at this time, the mechanical compression ratio at the internal combustion engine 1 becomes lower.

As explained above, the variable length connecting rods 6 can change the mechanical compression ratio in the internal combustion engine 1 to the two stages of a high compression ratio and low compression ratio. Note that, the variable compression ratio mechanism may be variable length connecting rods able to change the mechanical compression ratio in three stages (see Japanese Patent Publication No. 2016-118180A). Further, the variable compression ratio mechanism may be linear motion type variable length connecting rods each provided with an effective length changing member attached to a connecting rod body in a manner enabling linear motion so as to change the effective length of the variable length connecting rod (see Japanese Patent Publication No. 2015-527518 etc.)

Further, the variable compression ratio mechanism can be configured in any way so long as one able to change the mechanical compression ratio. For example, the variable compression ratio mechanism may be a multilink type piston stroke mechanism using a multilink mechanism to change the top dead center position of a piston (see Japanese Patent Publication No. 2005-69027A, Japanese Patent Publication No. 2001-227367A, etc.) Further, the variable compression ratio mechanism may be a movable block mechanism changing the distance between the cylinder block and the crankcase to thereby change the volumes of the combustion chambers (see WO 2009/060979A, Japanese Patent Publication No. 2013-238117A, etc.)

Further, the internal combustion engine 1 is further provided with detectors detecting the mechanical compression ratio finishing being changed. In the present embodiment, the gap sensors 90 correspond to the detectors. The gap sensors 90 are arranged in the cylinders 45 and fastened to the walls of the cylinder block 3. The gap sensors 90 are noncontact type distance measuring sensors. The gap sensors 90 detect the distances from the gap sensors 90 to the pistons 5. The smallest values of the distances detected correspond to the distances to the pistons 5 at the bottom dead center. The positions of the pistons 5 at the bottom dead center become closer to the gap sensors 90 the shorter the effective lengths of the variable length connecting rods 6, that is, the lower the mechanical compression ratio. Therefore, by detecting the smallest values of the distances from the gap sensors 90 to the pistons 5, it is possible to detect the mechanical compression ratios at the cylinders 45. For this reason, the gap sensors 90 can detect the mechanical compression ratios finishing being changed at the cylinders 45 when variable length connecting rods 6 cause the mechanical compression ratios to be changed from a high compression ratio to a low compression ratio or from a low compression ratio to a high compression ratio.

Note that, the detectors may be configured in any way so long as ones able to detect the mechanical compression ratio finishing being changed. For example, the detectors may be combustion pressure sensors detecting the mechanical compression ratios based on the combustion pressures inside the combustion chambers.

<Control Device of Variable Compression Ratio Internal Combustion Engine>

Figure 3:
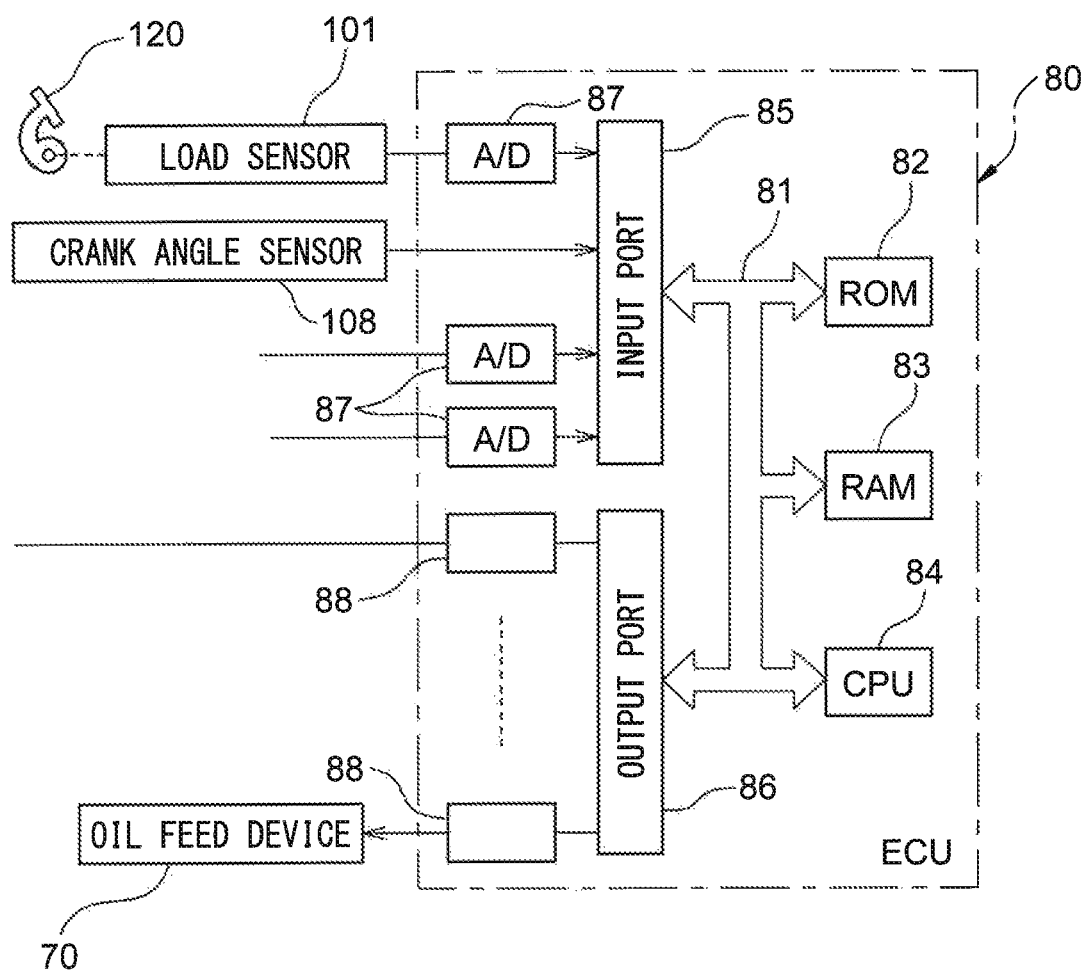
FIG. 3 is a block diagram showing the relationship between different members provided at an internal combustion engine and a control device.

FIG. 3 is a block diagram showing the relationship between the different parts provided at the internal combustion engine 1 and a control device. The internal combustion engine 1 is further provided with an electronic control unit (ECU) 80. The various control operations of the internal combustion engine 1 are performed by the ECU 80. Therefore, the ECU 80 functions as the control device of the internal combustion engine 1. The ECU 80 is comprised of a digital computer provided with components connected with each other by a bidirectional bus 81 such as a ROM (read only memory) 82, RAM (random access memory) 83, CPU (microprocessor) 84, input port 85, and output port 86. The outputs of the air flow meter 16, the gap sensors 90, and the load sensor 101 are input through corresponding AD converters 87 to the input port 85.

As shown in FIG. 1, the air flow meter 16 is arranged in the intake passage between the air cleaner 61 and the compressor 52 and detects the amount of flow of air through the inside of the intake pipe 15. The load sensor 101 generates an output voltage proportional to the amount of depression of the accelerator pedal 120 to detect the engine load of the internal combustion engine 1.

Furthermore, the input port 85 has a crank angle sensor 108 generating an output pulse every time the crankshaft rotates by, for example, 15°, connected to it. The crank angle sensor 108 detects the engine speed of the internal combustion engine 1.

On the other hand, the output port 86 is connected through the corresponding drive circuits 88 to the spark plugs 8, fuel injectors 10, throttle valve drive actuator 17, variable valve timing mechanisms A, B, motor 54, and oil feed device 70. The ECU 80 can control the ignition timings of the spark plugs 8, the injection timings and injection times of fuel injected from the fuel injectors 10, the opening degree of the throttle valve 18, the opening timings and closing timings of the intake valves 9, the opening timings and closing timings of the exhaust valves 12, and the operation of the motor 54. Further, the ECU 80 can control the operations of the variable length connecting rods 6 by the oil feed device 70 at the outside of the connecting rod bodies 31 and in turn control the mechanical compression ratio at the internal combustion engine 1.

<Control of Internal Combustion Engine when Raising Mechanical Compression Ratio>

As explained above, when providing variable length connecting rods 6 as the variable compression ratio mechanism, the mechanical compression ratio is changed from a low compression ratio to a high compression ratio by the inertial force acting on the piston pins 42 and is changed from a high compression ratio to a low compression ratio by the inertial force and explosive force acting on the piston pins 42. The inertial force is far smaller than the explosive force. For this reason, it is difficult to obtain a sufficient response when changing the mechanical compression ratio from a low compression ratio to a high compression ratio.

In this regard, in the intake stroke of the cylinders 45, the cylinder pressure falls below atmospheric pressure according to the opening degree of the throttle valve 18 etc., and negative pressure is generated in the cylinders. As a result, the cylinder pressure becomes lower than the pressure in the crankcase 2, so tension pulling the pistons 5 to the cylinder head 4 side is generated. This tension can assist the operation for raising the mechanical compression ratio, that is, the operation for turning the eccentric members 32 so as to make the pistons 5 separate from the crank pins 43. Further, by reducing the cylinder residual gas after the exhaust stroke of the cylinders 45, it is possible to increase the amount of drop of pressure in the cylinders due to the exhaust and in turn possible to increase the negative pressure in the cylinders in the intake stroke.

Focusing on the above fact, in the present embodiment, the following control is performed so as to improve the response when raising the mechanical compression ratio. In the present embodiment, the ECU 80 makes the exhaust promotion mechanism operate for at least a partial time period in the time period from when it is demanded to raise the mechanical compression ratio to when the mechanical compression ratio finishes being changed. By doing this, the negative pressure inside the cylinders in the intake stroke is made to increase and the tension due to the negative pressure can be made to increase. As a result, the response when raising the mechanical compression ratio can be improved.

Note that, even when a variable compression ratio mechanism other than variable length connecting rods is used, the tension due to the negative pressure assists the operation for reducing the volumes of the combustion chambers for raising the mechanical compression ratio. Therefore, according to the above-mentioned control, the response when raising the mechanical compression ratio is improved in internal combustion engines provided with any configuration of variable compression ratio mechanism.

<Explanation of Control Using Flow Chart>

Figure 4:
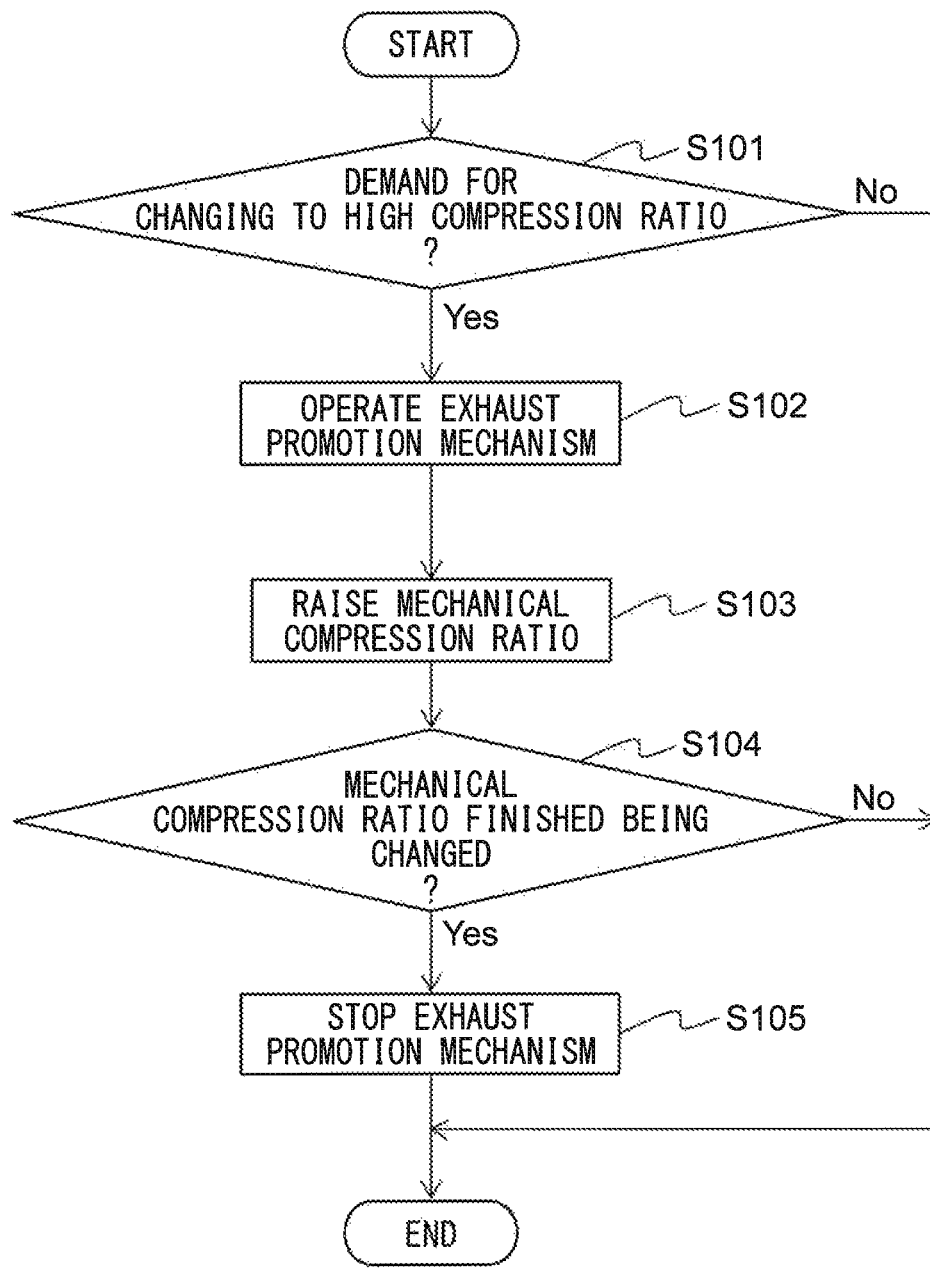
FIG. 4 is a flow chart showing a control routine of the internal combustion engine according to the first embodiment of the present invention.

Below, referring to the flow chart of FIG. 4, the above-mentioned control will be explained in detail. FIG. 4 is a flow chart showing a control routine of the internal combustion engine 1 according to the first embodiment of the present invention. The present control routine is repeatedly executed at predetermined time intervals by the ECU 80 after startup of the internal combustion engine 1.

First, at step S101, it is judged whether there is a demand to raise the mechanical compression ratio. Change of the mechanical compression ratio is demanded according to the operating state of the internal combustion engine 1. For example, when the engine load of the internal combustion engine 1 becomes a predetermined value or less, it is demanded that the mechanical compression ratio be changed from a low compression ratio to a high compression ratio. This demand is maintained until it is judged that the mechanical compression ratio has finished being changed.

If at step S101 it is judged that there has been no demand to raise the mechanical compression ratio, the present control routine ends. On the other hand, if at step S101 it is judged that there is a demand to raise the mechanical compression ratio, the present control routine proceeds to step S102. At step S102, the exhaust promotion mechanism is operated. In the present embodiment, the motor 54 of the turbocharger 50 is driven. As a result, exhaust from the cylinders 45 is promoted and the negative pressure inside the cylinders is increased.

Next, at step S103, the mechanical compression ratio is raised. In the present embodiment, the mechanical compression ratio is changed from a low compression ratio to a high compression ratio by using the oil feed device 70 to lengthen the effective lengths of the variable length connecting rods 6.

Next, at step S104, it is judged whether the mechanical compression ratio has finished being changed. The mechanical compression ratio finishing being changed is detected, for example, by detectors detecting the mechanical compression ratio finishing being changed. In the present embodiment, the gap sensors 90 detect the mechanical compression ratio finishing being changed. Note that, it may be judged that the mechanical compression ratio has finished being changed when the time elapsed from when the control for raising the mechanical compression ratio is started becomes a predetermined time or more. In this case, detectors such as the gap sensors 90 are not required. The predetermined time is determined in advance by experiments, calculation, etc.

If at step S104 it is judged that the mechanical compression ratio has not finished being changed, the present control routine is ended. On the other hand, if at step S104 it is judged that the mechanical compression ratio has finished being changed, the present control routine proceeds to step S105. At step S105, the exhaust promotion mechanism is stopped. In the present embodiment, the motor 54 of the turbocharger 50 is stopped. After step S105, the present control routine is ended.

Note that, if time is required for increasing the negative pressure by the exhaust promotion mechanism, the control for raising the mechanical compression ratio may be started after the elapse of a predetermined time from when making the exhaust promotion mechanism operate. Further, the exhaust promotion mechanism may be made to operate in a partial time period of the time period from when it is demanded that the mechanical compression ratio be raised to when the mechanical compression ratio finishes being changed. For example, the exhaust promotion mechanism may be made to operate only for a predetermined time from when it is demanded that the mechanical compression ratio be raised. Further, the exhaust promotion mechanism may be made to operate after the control for raising the mechanical compression ratio is started.

Second Embodiment

The variable compression ratio internal combustion engine according to the second embodiment is basically similar to the variable compression ratio internal combustion engine according to the first embodiment except for the points explained below. For this reason, below, the second embodiment of the present invention will be explained focusing on the parts differing from the first embodiment.

The inertial force acting on a piston pin 42 due to the reciprocating motion of a piston 5 inside a cylinder 45 of the internal combustion engine 1 is proportional to the square of the engine speed of the internal combustion engine 1. For this reason, in the low speed region of the internal combustion engine 1, a sufficient inertial force cannot be obtained and the response when raising the mechanical compression ratio greatly falls.

Therefore, in the second embodiment, the ECU 80 does not make the exhaust promotion mechanism operate when the engine speed is a predetermined reference speed or more even if it is demanded that the mechanical compression ratio be raised. In other words, the ECU 80 makes the exhaust promotion mechanism operate when the engine speed is less than the predetermined reference speed in at least a partial time period in the time period from when it is demanded that the mechanical compression ratio be raised to when the mechanical compression ratio finishes changing. By doing this, it is possible to secure the required response while reducing the power consumed due to the motor 54 being driven.

Further, usually, the lower the engine load of the internal combustion engine 1, the smaller the opening degree of the throttle valve 18 is made and the larger the negative pressure in the cylinders in the intake stroke. For this reason, if the engine load of the internal combustion engine 1 is relatively low, the tension caused by the negative pressure becomes relatively large. Further, if the engine load of the internal combustion engine 1 is relatively low, the negative pressure inside the cylinders is already large. For this reason, even if making the exhaust promotion mechanism operate, it is not possible to increase the negative pressure inside the cylinders much at all.

Therefore, in the second embodiment, the ECU 80 does not make the exhaust promotion mechanism operate when the engine load is a predetermined threshold value or less even if it is demanded that the mechanical compression ratio be raised. In other words, the ECU 80 makes the exhaust promotion mechanism operate when the engine load is larger than the predetermined threshold value in at least a partial time period in the time period from when it is demanded that the mechanical compression ratio be raised to when the mechanical compression ratio finishes changing. By doing this, it is possible to secure the required response while reducing the power consumed due to the motor 54 being driven.

Figure 5:
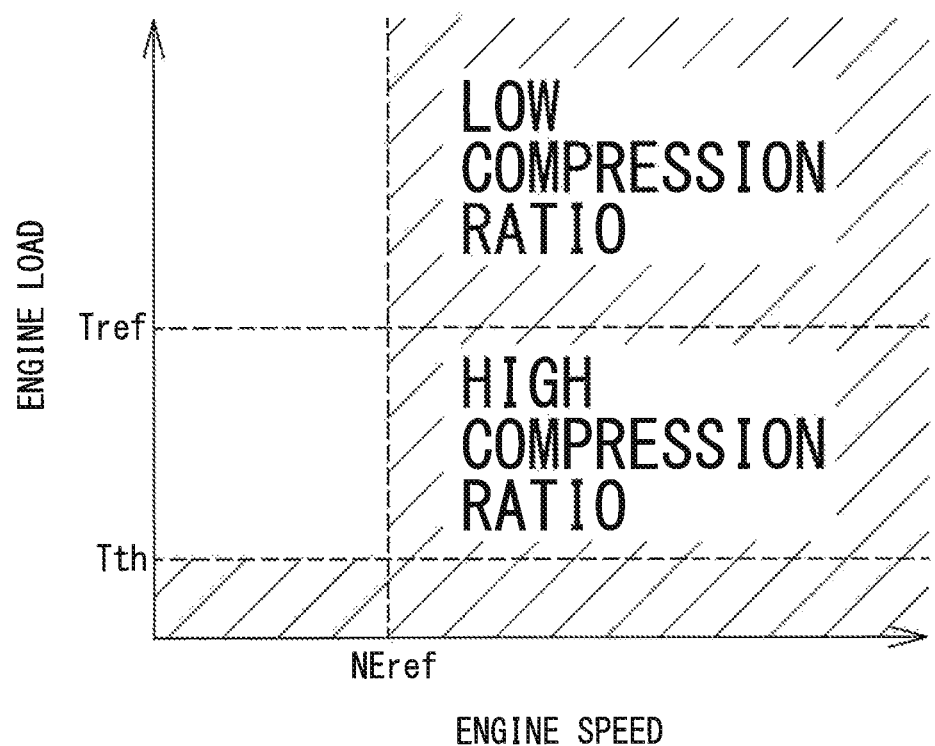
FIG. 5 is a graph showing one example of setting the mechanical compression ratio with respect to the engine speed and engine load.

FIG. 5 is a graph showing one example of setting the mechanical compression ratio with respect to the engine speed and engine load. In the illustrated example, in the region where the engine load is the reference value Tref or more, the mechanical compression ratio is set to the low compression ratio, while in the region where the engine load is less than the reference value Tref, the mechanical compression ratio is set to the high compression ratio. Further, in the figure, the region where operation of the exhaust promotion mechanism is prohibited when it is demanded to raise the mechanical compression ratio is shown by the hatching. In the illustrated example, operation of the exhaust promotion mechanism is prohibited in the region where the engine load is the threshold value Tth or less or the engine speed NE is the reference speed NEref or more. Note that, if the internal combustion engine 1 is stopped in the state where the mechanical compression ratio is set to the low compression ratio and if at the time of restart of the internal combustion engine 1, the mechanical compression ratio is attempted to be changed to the high compression ratio, change of the mechanical compression ratio to the high compression ratio can be demanded when the engine load is the threshold value Tth or less.

<Explanation of Control Using Flow Chart>

Figure 6:
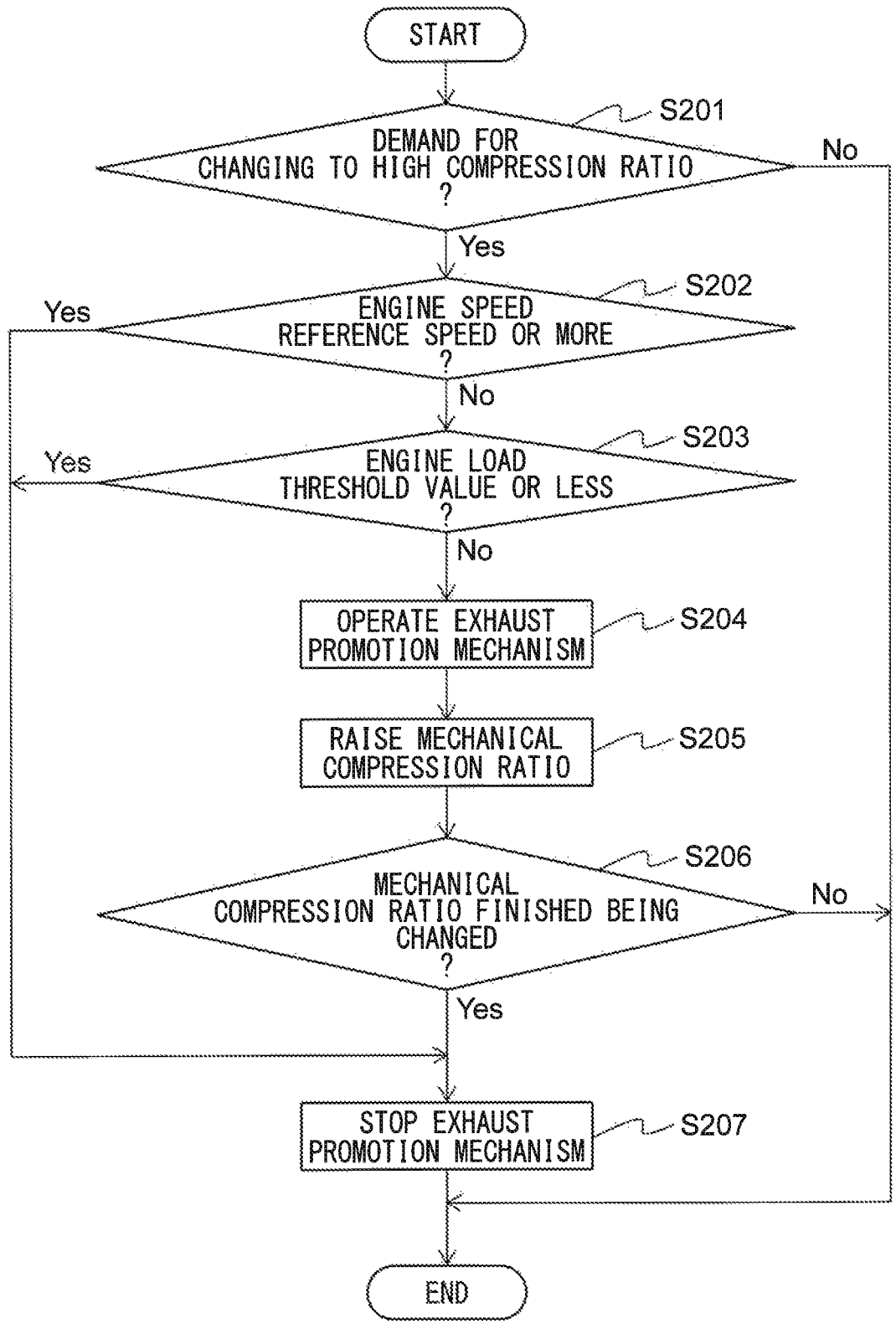
FIG. 6 is a flow chart showing a control routine of an internal combustion engine according to a second embodiment of the present invention.

Below, referring to the flow chart of FIG. 6, the above-mentioned control will be explained in detail. FIG. 6 is a flow chart showing the control routine of the internal combustion engine 1 in a second embodiment of the present invention. The present control routine is repeatedly executed at predetermined time intervals by the ECU 80 after startup of the internal combustion engine 1.

First, at step S201, in the same way as step S101 of FIG. 4, it is judged whether there is a demand for raising the mechanical compression ratio. If it is judged that there is no demand to raise the mechanical compression ratio, the present control routine is ended. On the other hand, if it is judged that there is a demand to raise the mechanical compression ratio, the present control routine proceeds to step S202.

At step S202, it is judged whether the engine speed is the reference speed or more. The engine speed is detected by the crank angle sensor 108. The reference speed is determined in advance by experiments, calculation, etc. If at step S202 it is judged that the engine speed is less than the reference speed, the present control routine proceeds to step S203.

At step S203, it is judged whether the engine load is the threshold value or less. The engine load is detected by the load sensor 101. The threshold value is determined in advance by experiments, calculation, etc. If at step S203 it is judged that the engine load is larger than the threshold value, the present control routine proceeds to step S204.

At step S204, the exhaust promotion mechanism is operated. In the present embodiment, the motor 54 of the turbocharger 50 is driven. Next, at step S205, the mechanical compression ratio is raised. In the present embodiment, the mechanical compression ratio is changed from a low compression ratio to a high compression ratio by using the oil feed device 70 to lengthen the effective lengths of the variable length connecting rods 6.

Next, at step S206, in the same way as at step S104 of FIG. 4, it is judged whether the mechanical compression ratio has finished being changed. If it is judged that the mechanical compression ratio has not finished being changed, the present control routine is ended. On the other hand, if it is judged that the mechanical compression ratio has finished being changed, the control routine proceeds to step S207.

At step S207, the exhaust promotion mechanism is stopped. In the present embodiment, the motor 54 of the turbocharger 50 is stopped. After step S207, the control routine is ended.

Further, if at step S202 it is judged that the engine speed is the reference speed or more or if at step S203 it is judged that the engine load is the threshold value or less, the control routine proceeds to step S207. For example, when fuel cut control is performed in the internal combustion engine 1, it is judged that the engine load is the threshold value or less. Fuel cut control is performed when the amount of depression of the accelerator pedal 120 is zero or substantially zero (that is, the engine load is zero or substantially zero) and the engine speed is a predetermined speed higher than the speed at the time of idling or is more.

At step S207, the exhaust promotion mechanism is stopped. After step S207, the control routine is ended. Therefore, even when it is demanded to raise the mechanical compression ratio, the exhaust promotion mechanism is not operated when the engine speed is the reference speed or more or when the engine load is a predetermined threshold value or less. Note that, either of step S202 and step S203 may be omitted.

Third Embodiment

In the third embodiment, as the exhaust promotion mechanism able to reduce the cylinder residual gas after the exhaust stroke of the cylinders 45, an electric turbine 55 is used instead of the turbocharger 50. Note that, in the variable compression ratio internal combustion engine of the third embodiment, control is performed in the same way as the first embodiment or second embodiment.

Figure 7:
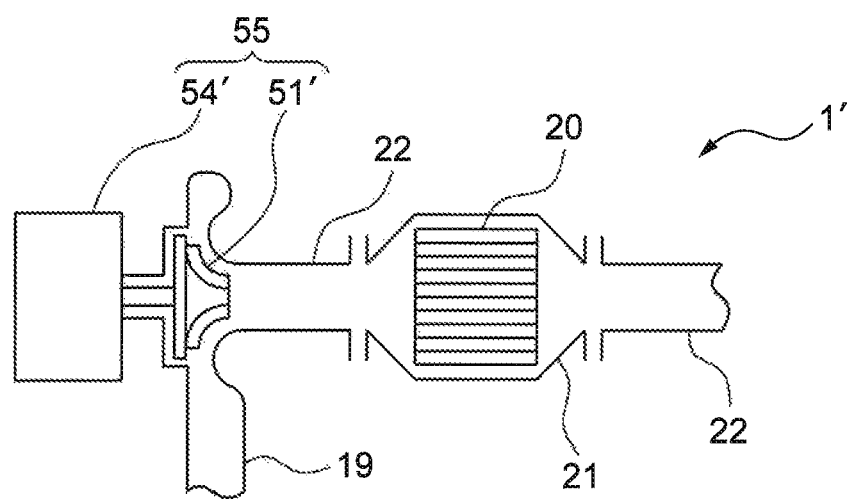
FIG. 7 is a view schematically showing a part of a variable compression ratio internal combustion engine according to a third embodiment of the present invention.

FIG. 7 is a view schematically showing a part of a variable compression ratio internal combustion engine 1' according to a third embodiment of the present invention (below, simply referred to as an "internal combustion engine 1'"). The internal combustion engine 1' is provided with an electric turbine 55.

The electric turbine 55 includes a turbine 51' arranged in the exhaust passage, and a motor 54' connected to the turbine 51'. If the flow of exhaust causes the turbine 51' to rotate, the motor 54' generates electric power. Therefore, the motor 54' is a motor-generator able to generate electric power by exhaust energy.

Further, if the motor 54' is driven, the rotation speed of the turbine 51' increases, so exhaust from the cylinders 45 is promoted and cylinder residual gas after the exhaust stroke of the cylinders 45 is reduced. Therefore, the electric turbine 55 can function as an exhaust promotion mechanism able to reduce the cylinder residual gas after the exhaust stroke of the cylinders 45.

In the internal combustion engine 1', by driving the motor 54' of the electric turbine 55, the exhaust promotion mechanism is operated. The motor 54', for example, is driven by electric power generated by an alternator (not shown) or electric power generated by exhaust energy.

OTHER EMBODIMENTS

Above, preferred embodiments according to the present invention were explained, but the present invention is not limited to these embodiments and can be modified and changed in various ways within the language of the claims.

For example, if time is required for increasing the negative pressure by the exhaust promotion mechanism, in the control routine of FIG. 4 or FIG. 6, control may be started for raising the mechanical compression ratio after the elapse of a predetermined time from when operating the exhaust promotion mechanism. Further, it is also possible to make the exhaust promotion mechanism operate only in a partial time period of the time period from when it is demanded to raise the mechanical compression ratio to when the mechanical compression ratio finishes being changed. For example, it is also possible to make the exhaust promotion mechanism operate only for a predetermined time from when it is demanded to raise the mechanical compression ratio. Further, it is also possible to make the exhaust promotion mechanism operate after control has started for raising the mechanical compression ratio.

REFERENCE SIGNS LIST

1, 1'. variable compression ratio internal combustion engine
6. variable length connecting rod (variable compression ratio mechanism)
50. turbocharger
55. electric turbine
80. electronic control unit (ECU)

The invention claimed is:

1. A variable compression ratio internal combustion engine, comprising:
   a variable compression ratio mechanism configured to change a mechanical compression ratio;
   an exhaust promotion mechanism configured to reduce cylinder residual gas after an exhaust stroke of cylinders; and
   a control device configured to control the mechanical compression ratio by the variable compression ratio mechanism and control an operation of the exhaust promotion mechanism, wherein
   the control device is configured to operate the exhaust promotion mechanism in at least a partial time period of a time period from when it is demanded that the mechanical compression ratio be raised to when the mechanical compression ratio finishes being changed;
   the variable compression ratio internal combustion engine further comprising a detector configured for detecting the mechanical compression ratio finishing being changed, wherein
   the control device is further configured to operate the exhaust promotion mechanism from when it is demanded that the mechanical compression ratio be raised to when the detector detects the mechanical compression ratio finishing being changed.

2. A variable compression ratio internal combustion engine, comprising:
   a variable compression ratio mechanism configured to change a mechanical compression ratio;
   an exhaust promotion mechanism configured to reduce cylinder residual gas after an exhaust stroke of cylinders; and
   a control device configured to control the mechanical compression ratio by the variable compression ratio mechanism and control an operation of the exhaust promotion mechanism, wherein
   the control device is configured to operate the exhaust promotion mechanism in at least a partial time period of a time period from when it is demanded that the mechanical compression ratio be raised to when the mechanical compression ratio finishes being changed;
   wherein the variable compression ratio mechanism is a variable length connecting rod comprising
   a connecting rod body provided with a crank receiving opening receiving a crank pin and
   an effective length changing member provided with a piston pin receiving opening receiving a piston pin and attached to the connecting rod body to be able to move so as to change a length between a center of the piston pin receiving opening and a center of the crank receiving opening;
   the variable compression ratio internal combustion engine further comprising a detector configured for detecting the mechanical compression ratio finishing being changed, wherein
   the control device is configured to operate the exhaust promotion mechanism from when it is demanded that the mechanical compression ratio be raised to when the detector detects the mechanical compression ratio finishing being changed.

* * * * *